July 25, 1944.  R. B. BELL  2,354,189
WINDSHIELD WIPER MECHANISM
Filed Feb. 19, 1941  3 Sheets-Sheet 1

INVENTOR
Rupert B. Bell.
BY
Harness, Dickey & Pierce
ATTORNEYS.

July 25, 1944.    R. B. BELL    2,354,189
WINDSHIELD WIPER MECHANISM
Filed Feb. 19, 1941    3 Sheets-Sheet 3

INVENTOR
Rupert B. Bell.
BY
Harness, Dickey & Pierce
ATTORNEYS.

Patented July 25, 1944

2,354,189

UNITED STATES PATENT OFFICE 2,354,189

WINDSHIELD WIPER MECHANISM

Rupert B. Bell, Ann Arbor, Mich., assignor to King-Seeley Corporation, Ann Arbor, Mich., a corporation of Michigan Application February 19, 1941, Serial No. 379,664

29 Claims. (Cl. 121—164)

The present invention relates to fluid motors and particularly relates to fluid motor constructions for operating windshield wipers.

One of the primary objects of the present invention is to provide an improved fluid motor construction of the type mentioned which is positively reversible in an improved manner.

Another object of the invention is to provide improved reversing mechanism in a motor of the type mentioned in which the mechanism is first moved at one speed to a reversing position and then is snapped to accomplish the reversal in a positive and quick manner.

Another object of the invention is to provide an improved reversing mechanism of the type mentioned which is relatively silent in its action.

Another object of the invention is to provide improved parking mechanism in motors of the type mentioned.

A further object of the invention is to provide improved parking mechanism which does not lock the reversing valve of the motor but which simply operates a control valve to vent both sides of the motor to atmosphere.

A further object of the invention is to provide improved parking mechanism in which a shiftable starting and stopping valve is prevented from returning to its stop position, when the same is operated to stop the motor, until the motor has continued to operate to return the wiper to its parking position, at which time the control valve is instantly moved to its stop position to vent both sides of the motor to atmosphere.

Another object of the invention is to provide an improved piston in motors of the type mentioned which is lubricated in an improved and simplified manner.

A further object of the invention is to provide an improved assembly in constructions of the type mentioned in which the parts are readily held together in shipping.

A further object of the invention is to provide an improved over-center spring action for reversing the motor in a positive manner.

A further object of the invention is to provide an improved valve action on motors of the type mentioned.

Other objects of the invention will become apparent from the following specification, the drawings relating thereto, and from the claims hereinafter set forth.

In the drawings in which like numerals are used to designate like parts in the several views throughout:

Fig. 8 is a cross-sectional view taken substantially along the line 8—8 of Fig. 3;

Fig. 9 is an enlarged, fragmentary front elevational view of the construction shown in Fig. 2 having one of the cover parts removed to show the internal operating construction thereof.

Although the present invention is specifically illustrated as being a fluid motor for use with windshield wipers, and while it has particular utility when so used, it will be appreciated by those skilled in the art that in its generic aspects it has other uses within the scope of the present invention.

Referring to the drawings, the windshield and dash portions of a conventional automotive vehicle are generally indicated at 10, and windshield wipers 12 are pivotally disposed adjacent the windshields in the usual way. Such wipers 12 are connected through the usual linkage means 14 with crank pins 16 of a crank arm 18. It will be appreciated that the crank arm 18 is oscillated through the action of the fluid motor generally indicated at 20 so that the wipers 12 act to wipe the windshield in the usual way.

The motor 20 is of the suction type and is operatively connected through a conduit 22 with the intake manifold of the automotive engine in the usual way.

Such motor includes a casing 24, which is generally cylindrical in shape, thus providing a piston cylinder, and which has removable end caps 26 secured to the opposite open ends thereof. Such end caps 26 are removably and sealably connected to the ends of the cylinder so as to seal the interior thereof against leakage through the ends.

The cylinder 24 receives therein a piston comprising a pair of piston cup assemblies 28, which are connected by a longitudinally extending rack member 30. Each of such assemblies 28 includes a disc-shaped pressure plate 32, having a central opening 34 therethrough and having an annular flange 36 formed at the outer periphery thereof which is disposed substantially parallel to the inner surface of the cylinder 24. Such member 32 is also provided with an annular inset portion 38 having a pair of diametrically opposed, relatively small openings 40 therethrough, which provides a lubrication chamber in a manner that will be described in detail hereinafter.

A disc-shaped piston cup 42 of suitable material is superimposed over the member 32, and has an annular flange portion 44 which is adapted to bear against the inner surface of cylinder 24. The piston spring 46, which is generally disc-shaped having a plurality of annularly spaced, resilient fingers 48 formed adjacent the periphery thereof by radially extending slots, is interposed between the member 42 and the facing surface of member 32. The fingers 48 are bent into the position shown, so that such fingers resiliently urge the peripheral flange 44 of the piston cup 42 against the inner surface of cylinder 24. Such member 46 is also provided with a plurality of radially inwardly extending slots 50 at a suitable number of positions therearound. Such slots 50 extend inwardly from selected ones of the radial peripheral slots to a position adjacent the chamber formed by the annular inset 38 so that lubricant, which is introduced through openings 40, may be conducted from such chamber outwardly onto the periphery of the piston cups 42 for the purpose of lubricating the sliding action of the piston assemblies 28. A backing plate 52, which is generally disc-shaped, has an inwardly turned shoulder 54 to provide a central opening therethrough, and engages the outer surface of member 42. A suitable means, such as a screw 56, is received through the central opening and engages the end of the member 30 for the purpose of securing the piston assembly to the member 30.

It will thus be seen that the complete piston assembly including the end assemblies 38 and the inter-connecting member 30, is free to slide within the cylinder 24 in response to pressure differentials at opposite ends thereof. In the motor here shown, such pressure differentials are created by means of alternately creating vacuum and atmospheric pressure at opposite ends of the cylinder, in a manner that will be described in detail hereinafter, so that the piston assembly is caused to reciprocate within the cylinder 24.

During such reciprocation, the teeth 60 of the rack 30 mesh with the teeth of a segmental drive gear 62. Such gear 62 is mounted on a drive shaft 64 and is fixed thereto by means of a suitable set screw 66. The drive shaft 64 is mounted within bearing openings 68 formed in the housing 24 with the ends projecting therethrough. The crank 18 is fixedly connected to one of the ends of the shaft 64, so that upon oscillation of such shaft the wipers are operated, as mentioned above.

The vacuum within the cylinder 24 is created through the conduit 22, as mentioned above, which is connected to an inlet stem 70 mounted on the casing 24 at one side and at substantially the longitudinal center thereof. Such inlet stem communicates with inlet passages 72 and 74 formed in the casing. The passage 74 opens through an upright surface 76 of the casing, and another inlet passageway 78, also communicating through the same surface, is formed in the casing above passageway 74. A slide valve 80 is slidably mounted on the face of wall 76 and is adapted to be positioned to provide communication between the passageways 74 and 78, or be positioned so that passageway 74 is shut off so that vacuum is not supplied passageway 78. Also, the valve is adapted to be positioned in intermediate positions to partially close passageway 74 or partially close passageway 78 so as to regulate the speed of the motor. When the valve is positioned so that passageway 74 is shut off, such valve places the passageway 78 in communication with an atmospheric chamber 234 formed in the casing 24 above passageway 78, so that both sides of the piston are vented to the atmosphere.

The valve 80 is mounted within an opening 82 of complementary shape formed in a parking slide 84 which is slidably disposed within a vertical guideway 86 formed in the casing 24, and which is adapted to be slidably positioned to control the position of valve 80 with respect to passageways 74 and 78 to control the operation and speed of operation of the motor. The lower end of the slide 84 is formed with an outwardly projecting tab 88, upon which a lateral projection 90 of a control lever 92 is adapted to bear. The control lever 92 is pivotally mounted on casing 24 by means of a pivot pin 94. A leaf spring element 96 has one end secured to a downwardly projecting portion 98 of the lever 92, and the forward end of the spring extends under the projection 88 and resiliently bears thereagainst. The upper end 99 of the lever 92 is operatively connected to suitable means, usually located on the vehicle dash, for operating the lever to shift the valve 80 to operate the wiper motor.

A control valve spring 101 is mounted on member 84 for movement therewith, with the upper and lower ends thereof resiliently bearing against the member 84 and with an intermediate instruck resilient arm 102 resiliently bearing against the outer face of valve 80. The spring is held in position by means of a coverplate 104, which is removably secured to the housing 24 by means of screws 106, or the like. It will thus be seen that the valve 80 is resiliently held against the face 76 of the casing, and that the slide 84 is correspondingly held but that such slide, together with the valve 80, may be shifted to start or stop the motor, upon actuation of the lever 92, to communicate with passageways 74 and 78 or to shut off passageway 74 and vent passageway 78 to atmosphere or to position the valve in intermediate positions to control the speed of the motor.

When the lever 92 is operated to shut off the motor, the spring element 96 resiliently urges the slide 84 together with the valve 80 upwardly, to shut off passageway 74. In parking, means are provided, which will be described later, which prevent the upward movement of the slide 84 unless the wipers are in parking position; and such means will resist the action of the spring until the wipers reach the parking position, at which time the slide is released for movement and the spring 82 will act to move the valve 80 to shut off passageway 74. This will be described in greater detail hereinafter in connection with the description of the parking means provided according to the present invention.

In order to reverse the piston assembly, valve means and valve shifting means, according to the present invention, are provided. Such means include a pair of passageways 108 and 110 disposed, respectively, on opposite sides of passageway 78. Such passageways 108 and 110 communicate, respectively, with passageways 112 and 114, which are formed in the casing 24 and which extend to opposite ends of the cylinder and communicate with the interior thereof through openings 116 adjacent the ends thereof.

An operating or reversing valve 118 is adapted to be slidably positioned over the inner openings of passageways 78, 108, and 110, and is of such a construction that it is shiftable to communicate the inlet passageway 78 with either one of the passageways 108 or 110. When in communication with one of the passageways, the vacuum is created in one end of the cylinder, while the opposite end is vented to atmosphere, so that the piston is caused to move toward said one end. When the valve is shifted to communicate the inlet passage 78 with the other of the passageways, it will be obvious that the movement of the piston is reversed.

In order to accomplish this reversal, means are provided which include a pivoted valve shifter 120 formed with a pivot aperture 122 therein which is pivotally received over a bearing boss 124 formed on the casing 24. The shifter 120 is formed with an opening 126 therethrough which is complementary in shape to and receives the projecting cover portion of the valve 118 therein, so that as the member 120 is shifted, the valve 118 is correspondingly shifted. The valve shifter spring 128 is secured to the shifter 120 by means of instruck tabs which engage within notches 130 formed in the shifter 120. Such spring 128 has a depending resilient tab 132 integral therewith which is adapted to resiliently engage the projecting cover surface of valve 118 so that such valve is resiliently urged into engagement with the face portion of casing 24, which face contains the adjacent passageways 78, 108, and 110.

The shifter 120 is also formed with a pair of integral, upstanding arms 134 formed with flanges providing facing surfaces 136. Such surfaces 136 are disposed at a predetermined angle so that they are properly spaced from each other for a purpose that will be hereinafter described. The lower end of shifter 120 is formed with an integral depending projection 138, over which a rubber bumper 140 is disposed. Stop projections 141 are formed in the casing 24 in the path of bumper 140 to limit the travel of the shifter 120 in either direction so that the valve 118 is properly positioned over the valve passageways as it is shifted from one position to the other.

The surfaces 136, bearing aperture 122 and projection 138 are in substantially the same vertical plane so that the shifter is not cocked on its bearing, thereby insuring quiet operation.

In order to shift the shifter 120 to reverse the valve in a positive manner, means are provided which include a kicker and spring carrier which are operatively connected with each other and with the piston so that when the piston reaches the end of its travel in one direction, the spring carrier and kicker are actuated to positively and quickly shift the valve 118 to its opposite position to reverse the movement of the piston.

The kicker is indicated at 142 and is provided with an opening 144 therethrough which receives the serrated head of a pivot pin 146. The pivot pin 146 is pivotally disposed within an opening 148 which is formed in the casing 24 and which is axially disposed with the opening 122 in the shifter 120. The kicker 142 is thus fixed for pivotal movement with the pivot pin 146.

An upstanding leaf spring 156 is fixed to the casing 24 adjacent the lower end thereof by means of a set screw 158 which is threadably received within a tapped opening in the casing 24. Such spring 156 extends upwardly to a position adjacent the center of the head of pin 146 and is adapted to resiliently bear against a pointed projection 160 integrally provided on such head. The pin 146, together with the kicker 142, is thus pivotally mounted in position within the housing 24. An upstanding kicker spring clamp 162 is provided with an opening therethrough and has a roughened surface which bears against the spring 156 and is held in position with respect thereto by means of the set screw 158. The member 162 has inwardly struck tabs 164 formed at opposite sides thereof and adjacent the top thereof which are adapted to lie beside the side edges of spring 156 so that such spring cannot be dislodged and will remain in position to bear against the pointed projection 160. This prevents the shifter and kicker elements from becoming dislodged, particularly during shipment.

The kicker 142 has an integral projection 166 formed in one side thereof upon which is disposed a rubber bushing 168 which serves as a bumper. The projection 166, together with the bumper 168, is disposed between the arms 134 of the shifter 120 so that as the kicker is pivoted, the bumper 168 strikes one of the surfaces 136 and thereby turns the shifter 120 to shift the valve 118. Stops 169 are formed in the housing in the path of movement of the bumper so as to limit its movement in either direction. The stops are so positioned that the limit of movement of the kicker is reached slightly before bumper 140 carried by the shifter strikes its stop 141, thereby enabling a slight amount of idle movement of the shifter relative to the kicker.

A spring pin 170 is fixed to the top end of the kicker 142 and projects outwardly therefrom on the side opposite from that of projection 166.

A spring carrier 172 is provided with a keyhole slot 174 therein and such carrier 172 is adapted to be pivotally mounted on a pivot portion 176 formed by cutting a groove in the head of screw 158. It will be evident that the carrier 172 may be mounted by passing the head through the enlarged part of the keyhole slot 174 and then pulling the carrier upwardly so that the reduced portion pivotally bears on portion 176 of the head.

An over-center coil spring 178 has the upper end thereof fixed to the spring pin 170 and has the lower end thereof hooked to an aperture 180 formed in the carrier 172 at substantially its midpoint between the sides thereof. The aperture is so positioned on the carrier 172 that the carrier is in its terminal positions, or "at rest" positions, when the spring acts to trip the kicker. Thus, the entire energy of the spring is used to trip the kicker.

The carrier 172 has a pair of upwardly extending side arms 182 which terminate in rounded upper ends and inwardly hooked portions 184 adjacent the upper ends thereof. The arms 182 are symmetrically disposed with respect to the center line of the carrier 172 and at a predetermined angle so that as the carrier 172 is pivoted, the arms cooperate with their associated parts in a manner that will be pointed out in detail hereinafter. Such arms are also formed with flanges 186 along portions of the sides thereof. The pivot points of the shifter 120, the kicker 142 and the carrier 172 lie in the same vertical plane and the spring 178 has an over-center action to shift the kicker 142 when the spring carrier 172 has been moved to a predetermined shifting position.

The carrier 172 is positioned in the path of movement of operating means formed at each end of the rack 30 so that as the rack 30 is reciprocated, such operating means serve to pivotally shift the spring carrier 172 from one side to the other. Such means are in the form of an integral shoulder portion 188 formed at each end of the rack which project toward each other and having an upstanding leaf spring 190 mounted thereon at each end. Such leaf spring 190 normally extends inwardly toward the carrier 172 on a predetermined arc and of predetermined length.

Figure 5:
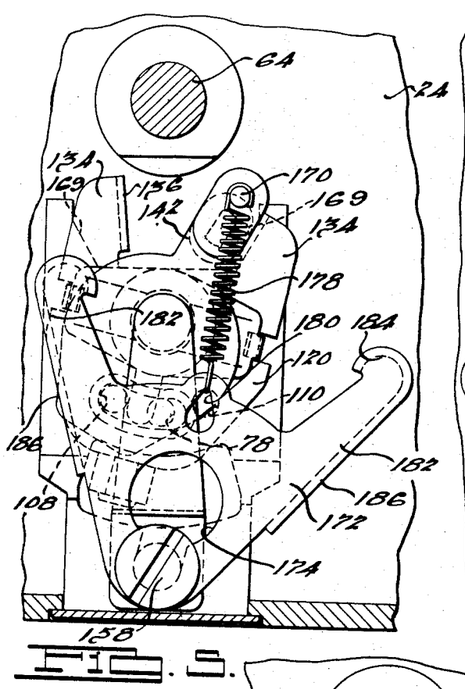
Fig. 5 is a cross-sectional view taken substantially along the line 5—5 of Fig. 3.
Figure 6:
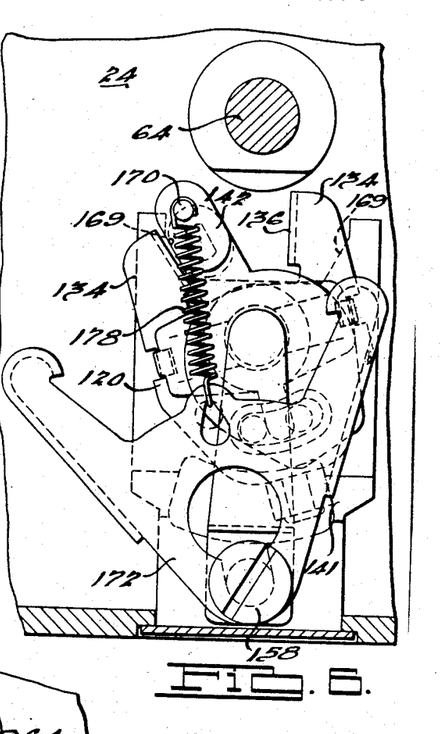
Fig. 6 is a view similar to Fig. 5 showing the parts in the opposite position.
Figure 7:
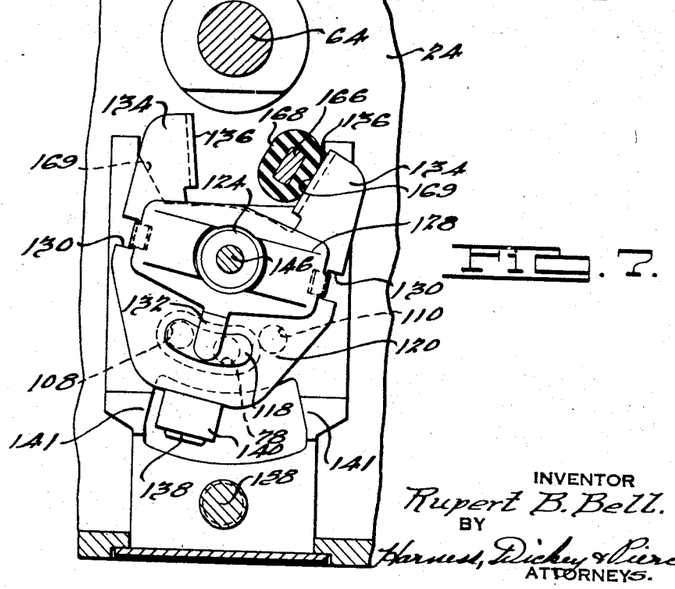
Fig. 7 is a cross-sectional view taken substantially along the line 7—7 of Fig. 3, slightly before the limit of travel.
Figure 10:
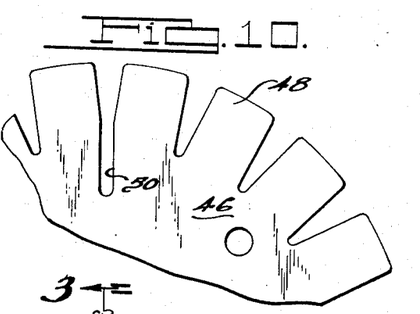
Fig. 10 is a fragmentary, elevational view of a portion of the piston cup spring, formed according to the present invention.

In the operation of the structure so far described, with the valve 80 positioned so that passageways 74 and 78 are in communication, a vacuum is applied to the inlet passageway 78. With the parts in the position shown in Figs. 4 and 5, such vacuum is applied to the passageway 108, due to the position of valve 118 and the piston is caused to move toward the left, viewing Fig. 4. As the piston, together with the rack 30, moves toward the left, the leaf spring 190, at the righthand end, first abuts against the righthand arm 182 of the carrier 172. The resiliency of the spring takes up the shock of the first contact with the arm 182 and serves to provide a smooth and quiet operation. The engagement of the spring 190 with the righthand arm 182 first causes the carrier 172 to rotate in a counter-clockwise direction, viewing Fig. 5, toward a shifting position. Such movement of the carrier 172 will be relatively slow so that the lower end of spring 178 is first positioned toward the center of travel. At the same time, the righthand arm 182 is moving toward the adjacent side edge of the kicker 142. As the normal limit of the piston travel is approached, the shoulder 188 then strikes against the flange 186 of the righthand arm 182 to move the carrier 172 at an increased rate of speed so that the spring 178 is carried over the center end at the same time the portion 184 of the arm abuts against the side edge of the kicker 142. The kicker 142 is then snapped in a counter-clockwise direction, viewing Fig. 5, so that the bumper 168 snaps against the lefthand surface 136 of shifter 120 to quickly shift the valve 118 to the position shown in Fig. 6. All of the elements above described then assume the position shown in Fig. 6 with the exception that the shifter may not always move beyond the position shown in Fig. 5. As shown in Fig. 6, the bumper 140 on the bottom of the shifter 120 may abut against the projection 141, due to the slight lost motion allowed, so as to limit the movement of the valve in that direction. The elements are then reversed so that the passageway 78 is in communication with passageway 110 so that the piston is caused to move in the opposite direction. This cycle is repeated so long as the passageway 74 is in communication with passageway 78, thereby causing oscillation of the operating crank lever 18.

Figure 1:
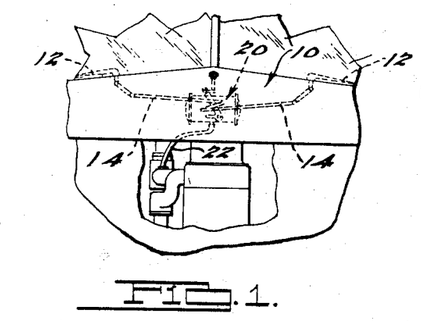
Figure 1 is a fragmentary elevational view, with parts removed, of the windshield of an automotive vehicle having a windshield wiper construction according to the present invention associated therewith.
Figures 2, 3, 4:
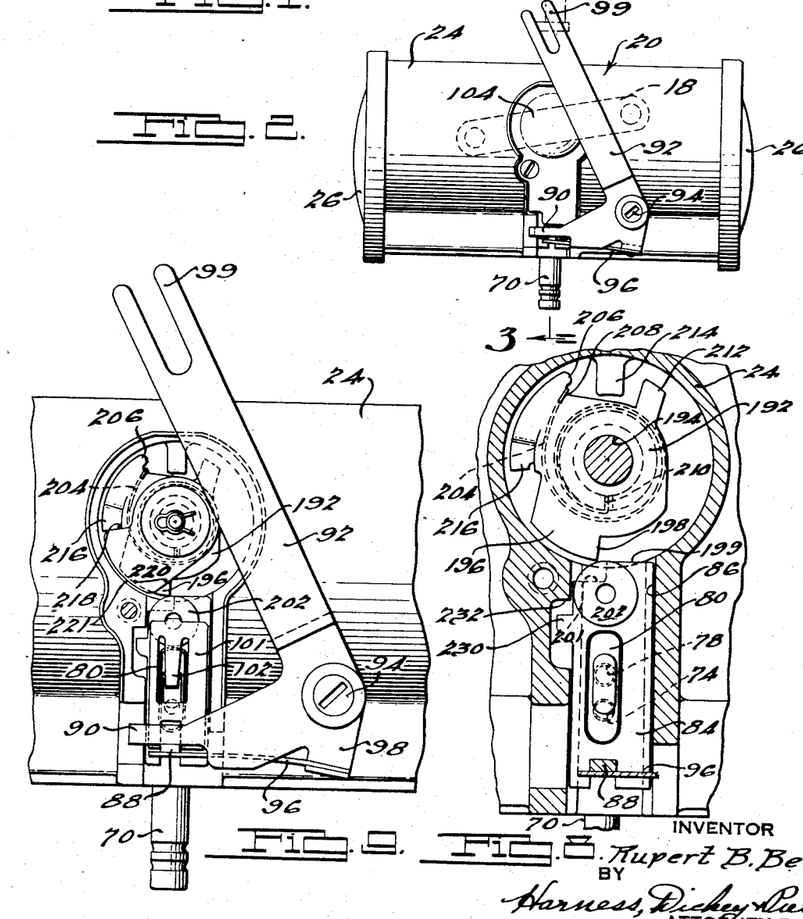
Fig. 2 is a front elevational view of a windshield wiper motor and operating means according to the present invention.
Fig. 3 is an enlarged cross-sectional view taken substantially along the line 3—3 of Fig. 2.
Fig. 4 is a partial cross-sectional view taken substantially along the line 4—4 of Fig. 3.
Figure 3:
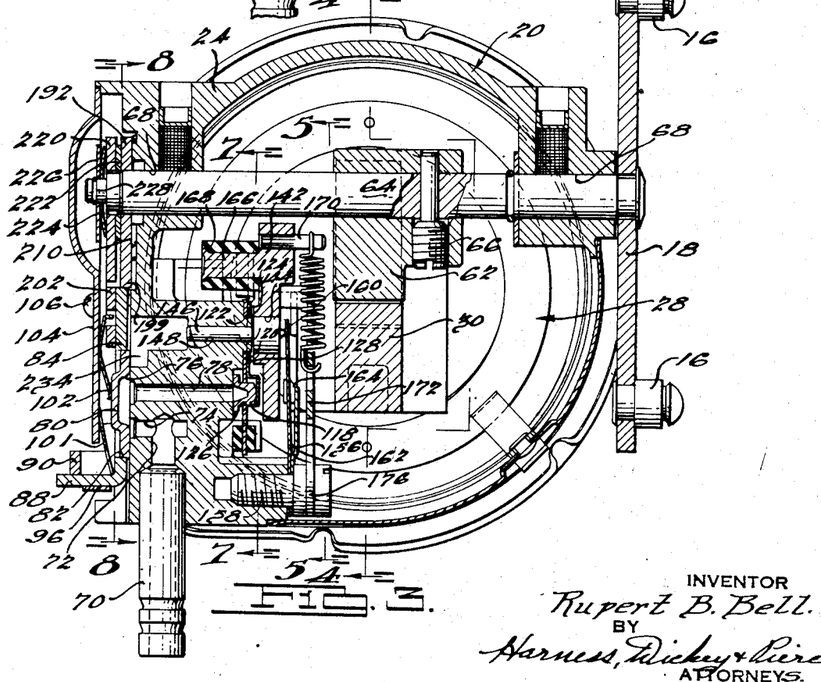
Figure 4:
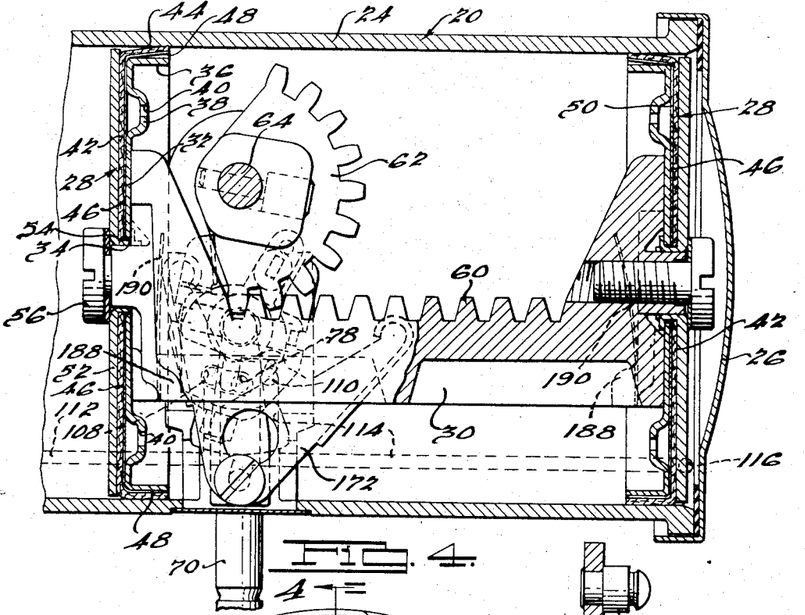

The wipers 12 and, correspondingly, operating crank 18, are adapted to move between predetermined positions including a parking position. According to the present invention, improved means are provided for insuring such operation of the motor that when the operating lever 92 is moved to stop the motor, such motor will not stop until the wipers and the lever 18 have been returned to parking position. Such means are best shown in Figs. 3, 9, and 8 and include a parking cam 192.

Such cam 192 is provided with a central opening 194 therethrough which is slipped over the drive shaft 64 and is free to pivot with respect to such shaft. Such cam 192 is formed with a depending projecting portion 196 providing a shoulder 198. Projection 196 is adapted to be positioned over the top edge 199 of the slide member 84. The top edge of such member 84 has a corner removed, as indicated at 201, and also has a disc member 202 welded to the outside face thereof. The projection 196 is normally resiliently urged to such position, so that the projection 196 overlies the edge 199, by means of a parking cam spring 204, which is spiral in form and which has one end hooked over a projection 206 formed on the cam, as indicated at 208. The opposite end of the spring 204 may be fixed to the housing 24, as indicated at 210. It will thus be seen that the spring 204 normally acts to urge the cam 192 to turn in a counterclockwise direction.

The cam 192 is also formed with an integral upstanding projection 212, which is adapted to move in the path of an integral, depending projection 214 formed on the housing 24, so that the extent of movement of the cam 192 in a counter-clockwise direction is limited when the projection 212 abuts against the projection 214.

The cam 192 is also formed with an outwardly offset projection 216 which lies in the path of movement of a shouldered projection 218 formed on another cam member 220. Such other cam member 220 is separated from the cam 192 by means of a washer 222, and is fixed to the drive shaft 64 for oscillation therewith. A spring washer 224, having a rigid washer 226 on the outside thereof, is positioned over the reduced end 228 of shaft 64, and is fixed thereto so that the spring washer 224 resiliently bears against the cam 220.

As stated above, the cam 220 oscillates with shaft 64, and as such cam 220 moves in a counterclockwise direction, viewing Fig. 9, the cam 192 follows along, due to the action of spring 204, so that the projection 196 overlies the surface 199 of the slide 84. When the cam 220 moves in a clockwise direction, the shoulder 218 abuts against the offset projection 216 and causes the cam 192 to rotate in a clockwise direction, so that the projection 196 adjacent the shoulder 198 overlies the cut-away corner 201. The slide 84 is then free to move upwardly until an integral projection 230 formed thereon abuts against a shoulder 232 formed in a recess provided in casing 24 which limits such upward movement.

To start the motor, the arm 92 is moved to move the slide 84 downwardly and the position of such slide controls the speed of the motor. As the slide starts to move down, the passageway 74 is uncovered to operate at one speed. As the downward movement is continued, the passageway is uncovered further until a point is reached when the maximum areas of passageways 74 and 78 are uncovered to give maximum motor speed and, therefore, maximum travel of the windshield wipers due to the greater intertia of the moving parts thereof. As the downward movement of the slide continues, the passageway 74 is covered, reducing the motor speed depending upon the extent of such coverage, until a minimum speed is reached which gives the minimum travel of the wiper blades. The proportions of the elements are such that the position of valve for parking position, as shown in Fig. 3, results in a motor speed greater than the minimum speed so that the parking takes place outside of the range of minimum travel. Thus, the parking point is set beyond the point at which the reversing valve trips and the elements are carried to such parking position due to their inertia.

The complete upward movement of the slide 84, together with the valve 80, is necessary to shut off passageway 74 and to therefore stop the motor. When the lever 92 is moved to shut off the motor, it will be appreciated that the spring 96 urges the slide 84 upwardly. With the wipers 12 and the operating lever 18 out of parking position, it will be understood that such upward movement of the slide 84 is prevented, due to abutment of the projection 196 against the upper edge 199. The motor continues to operate, at a speed greater than the slowest speed, since communication is still established between passageways 74 and 78, so that the wipers continue toward their parking position. As aforesaid, the inertia of the moving parts carries the wiper beyond the minimum limit of travel, which limit is determined by the point at which the reversing valve operates. When the wiper reaches the parking position, the cam 220, which is oscillating with shaft 64, abuts against offset projection 216 and moves the projection 196 away from engagement with the top edge 199 so that slide 84 is then free to move upwardly and is instantly moved to such position, due to the action of the loaded spring 96. The valve 80 then shuts off passageway 74 and the inlet passageway 78 is vented to the atmosphere through atmospheric chamber 234. The opposite end of the cylinder is vented to the atmosphere through the uncovered port 108.

When the motor is shut off, the wipers may be manually moved since the drive shaft is not locked. When the wipers are so turned away from the parking position, the curved portion of the starting cam 220 will move the slide 84 downwardly against the action of the spring 96 to operate the motor and return the wiper to its parked position. Also such wipers may be manually moved beyond the parked position within the limits of any obstructions on the windshield.

Formal changes may be made in the specific embodiment of the invention described without departing from the spirit and substance of the invention, the scope of which is commensurate with the appended claims.

What is claimed is:

1. A fluid motor construction including relatively movable elements, automatic valve mechanism disposed to occupy either one of two operative positions for controlling movement between said elements, said automatic valve mechanism being operably responsive to the movement of one of said elements and including a shiftable part movable between said positions, a kicker movable to shift said shiftable part, a spring carrier, spring means connecting said carrier and said kicker to move said kicker when said carrier is moved to a predetermined position, said carrier being mounted for movement with respect to said one element and being disposed to be operated by said one element and having at least one portion engageable with the kicker to effect positive movement of the kicker.

2. A fluid motor construction including relatively movable elements, automatic valve mechanism disposed to occupy either one of two operative positions for controlling movement between said elements, said automatic valve mechanism being operably responsive to the movement of one of said elements and including a pivoted shiftable part movable between said positions, a pivoted picker movable to shift said shiftable part, a pivoted spring carrier mounted for movement with respect to said one element, spring means connecting said carrier and said kicker to move said kicker when said carrier is moved to a predetermined position, said carrier being disposed in the path of movement of said one element and operated thereby and having at least one portion engageable with the kicker to effect positive movement of the kicker.

3. A fluid motor construction including relatively movable elements, automatic valve mechanism disposed to occupy either one of two operative positions for controlling movement between said elements, said automatic valve mechanism being operably responsive to the movement of one of said elements and including a shiftable part movable between said positions, a kicker movable to shift said shiftable part, a spring carrier mounted for movement with respect to said one element, spring means connecting said carrier and said kicker to move said kicker when said carrier is moved to a predetermined position, said carrier being operably connectible with said one element and operated thereby and the construction and arrangement of said carrier and said one element with respect to each other being such that said carrier is first moved into shifting position at one rate of speed and is then shifted at an increased rate of speed.

4. A fluid motor construction including relatively movable elements, automatic valve mechanism disposed to occupy either one of two operative positions for controlling movement between said elements, said automatic valve mechanism being operably responsive to the movement of one of said elements and including a pivoted shiftable part movable between said positions, a pivoted kicker movable to shift said shiftable part, a pivoted spring carrier mounted for pivotal movement with respect to said one element, spring means connecting said carrier and said kicker to move said kicker when said carrier is moved to a predetermined position, said carrier being operably connectible with said one element and operated thereby and the construction and arrangement of said carrier and said one element with respect to each other being such that said carrier is first moved into shifting position at one rate of speed and is then shifted at an increased rate of speed.

5. A fluid motor construction including relatively movable elements, automatic valve mechanism disposed to occupy either one of two operative positions for controlling movement between said elements, said automatic valve mechanism being operably responsive to the movement of one of said elements and including a shiftable part movable between said positions, a kicker movable to shift said shiftable part, said shiftable part being disposed in the path of movement in either direction of said kicker, a spring carrier mounted for movement with respect to said one element, over-center spring means connecting said carrier and said kicker to move said kicker when said carrier is moved to a predetermined position, said carrier being disposed in the path of movement of said one element to be engaged and operated by said one element, and the construction and arrangement of said carrier, said kicker and said one element with respect to each other being such that said carrier is first moved into a shifting position and then said kicker is snapped to abut against said shifter to thereby quickly shift said valve.

6. A fluid motor construction including relatively movable elements, automatic valve mechanism disposed to occupy either one of two operative positions for controlling movement between said elements, said automatic valve mechanism being operably responsive to the movement of one of said elements and including a shiftable part movable between said positions, said shiftable part having integral spaced arms, a movable kicker having an integral portion disposed between said arms and adapted to abut against either of said arms to shift said shiftable part, a movable spring carrier mounted for movement with respect to said one element, an over-center spring connecting said carrier and said kicker, said carrier being operably connectible with said one element and operated thereby and the construction and arrangement of said carrier, said kicker and said one element with respect to each other being such that when said carrier is moved into shifting position said kicker is snapped, and said portion of said kicker snaps against one of said arms to thereby shift said valve.

7. A fluid motor construction including relatively movable elements, automatic valve mechanism disposed to occupy either one of two operative positions for controlling movement between said elements, said automatic valve mechanism being operably responsive to the movement of one of said elements and including a shiftable part movable between said positions, said shiftable part having integral spaced arms, a pivoted kicker having an integral portion disposed between said arms and adapted to abut against either of said arms to shift said shiftable part, a pivoted spring carrier mounted for pivotal movement with respect to said one element, an over-center spring connecting said carrier and said kicker, said carrier being operably connectible with said one element and the construction and arrangement of said carrier, said kicker and said one element with respect to each other being such that when said carrier is moved into shifting position said kicker is snapped, and said portion of said kicker snaps against one of said arms to thereby shift said valve.

8. A fluid motor construction including relatively movable elements, automatic valve mechanism disposed to occupy either one of two operative positions for controlling movement between said elements, said automatic valve mechanism being operably responsive to the movement of one of said elements and including a shiftable part movable between said positions, a movable kicker movable to move said shiftable part, a movable spring carrier, spring means connecting said carrier and said kicker to move said kicker when said carrier is moved to a predetermined position, said carrier being disposed in the path of movement of said one element, said one element having an integral portion which first engages said carrier to first move said carrier into shifting position and has another integral portion which then engages said carrier to move said carrier at an increased rate of speed, to thereby quickly shift said valve.

9. A fluid motor construction including relatively movable elements, automatic valve mechanism disposed to occupy either one of two operative positions for controlling movement between said elements, said automatic valve mechanism being operably responsive to the movement of one of said elements and including a shiftable part movable between said positions, a movable kicker movable to move said shiftable part, a movable spring carrier, spring means connecting said carrier and said kicker to move said kicker when said carrier is moved to a predetermined position, said carrier being disposed in the path of movement of said one element, said one element having an integral resilient portion which first engages said carrier to first move said carrier into shifting position at one rate of speed and having another integral portion which then engages said carrier to shift said carrier at an increased rate of speed.

10. A fluid motor construction including relatively movable elements, automatic valve mechanism disposed to occupy either one of two operative positions for controlling movement between said elements, said automatic valve mechanism being operably responsive to the movement of one of said elements and including a shiftable part movable between said positions, a movable kicker movable to shift said shiftable part, a movable spring carrier including spaced arms, spring means connecting said carrier and said kicker to move said kicker when said carrier is moved to a predetermined position, said arms being disposed in the path of movement of said one element, and also being disposed to abut against said kicker, and the construction and arrangement of said arms, said kicker and said one element with respect to each other being such that said one element abuts against one of said arms to first move said carrier into shifting position and then shift said carrier so that one of said arms abuts against said kicker to thereby snap said kicker into engagement with said shiftable part to thereby quickly shift said valve.

11. A fluid motor construction including relatively movable elements, automatic valve mechanism disposed to occupy either one of two operative positions for controlling movement between said elements, said automatic valve mechanism being operably responsive to the movement of one of said elements and including a shiftable part movable between said positions, a movable kicker movable to shift said shiftable part, a movable spring carrier including spaced arms, spring means connecting said carrier and said kicker to move said kicker when said carrier is moved to a predetermined position, said arms being disposed in the path of movement of said one element, and the construction and arrangement of said arms and said one element with respect to each other being such that said one element abuts against one of said arms to first move said carrier into shifting position at one rate of speed and then shift said carrier at an increased rate of speed, to snap said kicker into engagement with said shiftable part to thereby quickly shift said valve.

12. A fluid motor construction including a movable element movable between predetermined positions including a parking position, a reversible valve shiftable to reverse said motor, operating means to start and stop said motor, means providing atmospheric vents associated with said operating means and parking means operative when said operating means is operated to stop said motor to return said element to its parking position, said parking means being operatively connected to said operating means so that said operating means is not permitted to move to stop said motor until said element is in its parking position and said operating means then cooperates with said vent means to vent said motor to atmosphere.

13. A fluid motor construction including a movable element movable between predetermined positions including a parking position, a reversible valve shiftable to reverse said motor, operating means to start and stop said motor, means providing atmospheric vents associated with said operating means, and parking means operative when said operating means is operated to stop said motor to return said element to its parking position, said parking means being operatively connected to said operating means and being free of connection with said reversible valve so that said reversible valve is free to shift until said element returns to its initial set position, at which time said operating means is permitted to move to stop said motor and cooperate wtih said vent means to vent said motor to atmosphere.

14. A fluid motor construction including a movable element movable between predetermined positions including a parking position, a reversible valve shiftable to reverse said motor, another valve movable to start and stop said motor, means providing atmospheric vents associated with said another valve, and parking means operative when said another valve is shifted to stop said motor to return said element to its initial said position, said parking means being operatively connected with said another valve and preventing movement of said another valve to its stop position until said element is in its parking position at which time said another valve cooperates with said vent means to vent said motor to the atmosphere.

15. A fluid motor construction including a movable element movable between predetermined positions including a parking position, a reversible valve shiftable to reverse said motor, another valve movable to start and stop said motor, means providing atmospheric vents associated with said another valve, and parking means operative when said another valve is shifted to stop said motor to return said element to its initial set postiion, said parking means being operatively connected with said another valve and preventing movement of said another valve to its stop position until said reversible valve has been operated to return said element to its parking position at which time said parking means permits said another valve to move to its stop position and cooperate with said vent means to vent said motor to atmosphere.

16. A fluid motor construction including a movable element movable between predetermined positions including a parking position, a driven element operatively connected to said movable element, a reversible valve shiftable to reverse the movement of said element, another valve movable to start and stop said motor, and parking means operatively connected to said another valve, said parking means including a stop member positioned to prevent movement of said another valve to its stop position when said element is out of its parking position, and means movable wtih respect to said stop member and engageable therewith to move said stop member when said element is in its parking position.

17. A fluid motor construction including a movable element movable between predetermined positions including a parking position, a driven element operatively connected to said movable element, a reversible valve shiftable to reverse the movement of said element, another valve movable to start and stop said motor and parking means operatively connected to said another valve, said parking means including a stop member positioned to prevent movement of said another valve to its stop position when said element is out of its parking position, and means mounted on said driven element for movement therewith and movable with respect to said stop member and engageable therewith to move said stop member when said element is in its parking position.

18. A fluid motor construction including a movable element movable between predetermined positions including a parking position, a driven element operatively connected to said movable element, a reversible valve shiftable to reverse the movement of said element, another valve movable to start and stop said motor, and parking means operatively connected to said another valve, said parking means including a movable stop member movable into position to prevent movement of said another valve to its stop position when said element is out of its parking position, and means movable with respect to said stop member and engageable therewith to move said stop member out of said position to permit movement of said valve to its stop position when said element is in its parking position.

19. A fluid motor construction including a movable element movable between predetermined positions including a parking position, a driven element operatively connected to said movable element and movable therewith, a reversible valve shiftable to reverse the movement of said element, another valve movable to start and stop said motor, and parking means operatively connected to said another valve, said parking means including a movable stop member movable into position to prevent movement of said another valve to its stop position when said element is out of its parking position, and means mounted on said driven element for movement therewith and movable with respect to said stop member and engageable therewith to move said stop member out of said position to permit movement of said valve to its stop position when said element is in its parking position.

20. A fluid motor construction including a movable element movable between predetermined positions including a parking position, a reversible valve shiftable to reverse the movement of said element, another valve movable to start and stop said motor, and parking means operatively connected to said another valve, said parking means including a movable stop member, resilient means normally urging said stop member into a position to prevent movement of said another valve to its stop position when said element is out of its parking position, and means to move said stop member out of said position to permit movement of said valve to its stop position when said element is in its parking position.

21. A fluid motor construction including a movable element movable between predetermined positions including a parking position, a reversible valve shiftable to reverse the movement of said element, another valve movable to start and stop said motor, and parking means operatively connected to said another valve, said parking means including a movable stop member, resilient means normally urging said stop member into a position to prevent movement of said another valve to its stop position when said element is out of its parking position, and means movable with said movable element and positioned to abut against said stop member to move said stop member out of said position to thereby permit movement of said valve to its stop position when said element is in its parking position.

22. A fluid motor construction including a movable element movable between predetermined positions including a parking position, a reversible valve shiftable to reverse the movement of said element, another valve movable to start and stop said motor, parking means, means including a slide member operatively connecting said parking means to said another valve, said parking means including a movable stop member movable into position to prevent movement of said slide member so that movement of said another valve to its stop position is prevented when said element is out of its parking position, and means to move said stop member out of said position to permit movement of said slide member so that said valve may move to its stop position when said element is in its parking position.

23. In a fluid motor assembly, a casing, passageways formed in said casing, a valve slidably disposed over said passageways, means pivotally mounted to said casing and engaging said valve to move said valve, movable means disposed to move said first named means, a pivot pin secured to said last named means and pivotally mounted on said housing, resilient means engaging said pivot pin and preventing displacement of said pin with respect to said housing, and means to prevent displacement of said resilient means.

24. In a fluid motor assembly, a casing, passageways formed in said casing, a valve slidably disposed over said passageways, means pivotally mounted to said casing and engaging said valve to move said valve, movable means disposed to move said first named means, a pivot pin secured to said last named means and pivotally mounted on said housing, resilient means engaging said pivot pin and preventing displacement of said pin with respect to said housing, and means fixed to said casing and extending to positions adjacent said resilient means to prevent accidental displacement of said resilient means.

25. A fluid motor construction including a movable element movable between predetermined positions including a parking position, a reversible valve shiftable to reverse the movement of said element, another valve movable to start and stop said motor, and parking means operatively connected to said another valve, said parking means including a movable stop member, resilient means normally urging said stop member in one direction into a position to prevent movement of said another valve to its stop position when said element is out of its parking position, and another movable member disposed adjacent said stop member movable to engage said stop member to move said stop member in the opposite direction against the action of said resilient means to permit movement of said valve to its stop position when said element is in its parking position.

26. A fluid motor construction including relatively movable elements, automatic valve mechanism disposed to occupy either one of two operative positions for controlling movement between said elements, said automatic valve mechanism being operably responsive to the movement of one of said elements and including a pivoted shiftable part movable between said positions, a pivoted kicker movable to shift said shiftable part, a pivoted spring carrier movable to engage said kicker, over-center spring means connecting said carrier and said kicker, said spring means being arranged with respect to said carrier to snap over said kicker when said carrier is moved to a terminal position, said carrier being disposed to be operated by said one element.

27. A fluid motor construction including a movable element movable between predetermined positions including a parking position, a reversible valve shiftable to reverse said motor, another valve movable to start and stop said motor, means for urging said other valve towards the stop position, said movable element having a part associated therewith for preventing said movement of said other valve until said motor reaches the parking position, said part moving out of range of said other valve when said parking position is reached and enabling said other valve to quickly move to the parking position, and a member responsive to movement of said movable element for moving said other valve out of the parking position.

28. A fluid motor construction including relatively movable elements, automatic valve mechanism disposed to occupy either one of two operative positions for controlling movement between said elements, said automatic valve mechanism being operably responsive to the movement of one of said elements and including a shiftable part movable between said positions, a kicker movable to shift said shiftable part, said shiftable part being disposed in the path of movement in either direction of said kicker, a spring carrier, spring means connecting said carrier and said kicker to move said kicker when said carrier is moved to a predetermined position, said carrier being mounted for movement with respect to said one element and being disposed to be operated by said one element and having at least one portion engageable with the kicker to effect positive movement of the kicker.

29. A fluid motor construction including relatively movable elements, automatic valve mechanism disposed to occupy either one of two operative positions for controlling movement between said elements, said automatic valve mechanism being operably responsive to the movement of one of said elements and including a shiftable part movable between said positions, a kicker movable to shift said shiftable part, said shiftable part being disposed in the path of movement in either direction of said kicker, a spring carrier mounted for movement with respect to said one element, over-center spring means connecting said carrier and said kicker to move said kicker when said carrier is moved to a predetermined position, said carrier being disposed in the path of movement of said one element to be engaged and operated by said one element and having at least one portion engageable with the kicker to effect positive movement of the kicker, and the construction and arrangement of said carrier, said kicker and said one element with respect to each other being such that said carrier is first moved into a shifting position and then said kicker is snapped to abut against said shifter to thereby quickly shift said valve.

RUPERT B. BELL.